(12) United States Patent
Shiwaya

(10) Patent No.: US 8,278,991 B2
(45) Date of Patent: Oct. 2, 2012

(54) POWER SUPPLY CIRCUIT AND METHOD FOR CONTROLLING THE SAME

(75) Inventor: Yohichi Shiwaya, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 12/811,924

(22) PCT Filed: Dec. 5, 2008

(86) PCT No.: PCT/JP2008/072597
§ 371 (c)(1),
(2), (4) Date: Jul. 7, 2010

(87) PCT Pub. No.: WO2009/090812
PCT Pub. Date: Jul. 23, 2009

(65) Prior Publication Data
US 2010/0277227 A1    Nov. 4, 2010

(30) Foreign Application Priority Data
Jan. 15, 2008   (JP) .................. 2008-005844

(51) Int. Cl.
G05F 1/10        (2006.01)
G05F 3/02        (2006.01)

(52) U.S. Cl. .......................................... 327/536
(58) Field of Classification Search ............ 327/536; 363/59–60; 307/109–110
See application file for complete search history.

(56) References Cited

U.S. PATENT DOCUMENTS

| | | | | |
|---|---|---|---|---|
| 5,751,186 A | * | 5/1998 | Nakao | ................ 327/562 |
| 5,898,323 A | * | 4/1999 | Suda | ................ 327/66 |
| 7,030,686 B2 | | 4/2006 | Itoh | |
| 7,053,751 B2 | | 5/2006 | Itoh | |
| 7,176,753 B2 | | 2/2007 | Noda et al. | |
| 7,183,755 B2 | | 2/2007 | Itoh et al. | |
| 7,196,504 B2 | | 3/2007 | Itoh | |
| 7,268,523 B2 | | 9/2007 | Itoh | |
| 7,274,180 B2 | | 9/2007 | Itoh | |

(Continued)

FOREIGN PATENT DOCUMENTS

JP    2002-204567    7/2002

(Continued)

OTHER PUBLICATIONS

International Search Report in PCT/JP2008/072597.

(Continued)

*Primary Examiner* — Quan Tra
(74) *Attorney, Agent, or Firm* — Cooper & Dunham LLP

(57) ABSTRACT

A power supply circuit includes a charge pump circuit configured to raise a voltage inputted from an input terminal and supply the raised voltage from an output terminal to a given load and a control circuit unit. The charge pump circuit includes a fly-back capacitor configured to store a charge of the voltage inputted from the input terminal and an output transistor connected between one terminal of the fly-back capacitor and the output terminal of the charge pump circuit. The control circuit unit receives a reference voltage and the voltage outputted from the charge pump circuit and is configured to generate a proportional voltage proportional to the voltage outputted from the charge pump circuit and output a voltage to control the output transistor depending on a difference between the proportional voltage and the reference voltage so that the proportional voltage has the same voltage level as the reference voltage.

5 Claims, 7 Drawing Sheets

U.S. PATENT DOCUMENTS

| | | | |
|---|---|---|---|
| 7,348,834 B2 | 3/2008 | Itoh | |
| 7,358,709 B2 | 4/2008 | Itoh | |
| 7,480,125 B2 | 1/2009 | Itoh | |
| 7,511,561 B2 | 3/2009 | Nagatomo et al. | |
| 2002/0051372 A1 | 5/2002 | Hoshino et al. | |
| 2006/0170461 A1* | 8/2006 | Bhattacharya et al. | 327/65 |
| 2006/0255781 A1 | 11/2006 | Itoh | |
| 2008/0018382 A1 | 1/2008 | Nagatomo et al. | |
| 2008/0029846 A1 | 2/2008 | Itoh | |
| 2008/0143308 A1* | 6/2008 | Hsieh et al. | 323/280 |

FOREIGN PATENT DOCUMENTS

| | | |
|---|---|---|
| JP | 2002-252967 | 9/2002 |
| JP | 2003-37179 | 2/2003 |
| JP | 2005-100296 | 4/2005 |
| JP | 2005-148942 | 6/2005 |
| JP | 2005-174208 | 6/2005 |
| JP | 2005-190381 | 7/2005 |
| JP | 2005-196251 | 7/2005 |
| JP | 2005-209007 | 8/2005 |
| JP | 2005-234674 | 9/2005 |
| JP | 2005-242665 | 9/2005 |
| JP | 2005-267528 | 9/2005 |
| JP | 2005-301409 | 10/2005 |
| JP | 2005-301410 | 10/2005 |
| JP | 2006-48116 | 2/2006 |
| JP | 2006-209327 | 8/2006 |
| JP | 2006-260030 | 9/2006 |
| JP | 2006-309569 | 11/2006 |
| JP | 2006-320158 | 11/2006 |
| JP | 2007-4591 | 1/2007 |
| JP | 2007-35068 | 2/2007 |
| JP | 2007-94540 | 4/2007 |
| JP | 2007-206948 | 8/2007 |
| JP | 2008-29098 | 2/2008 |

OTHER PUBLICATIONS

Dec. 19, 2011 Korean official action (with English Translation) in connection with a counterpart Korean patent application.

* cited by examiner

FIG.3
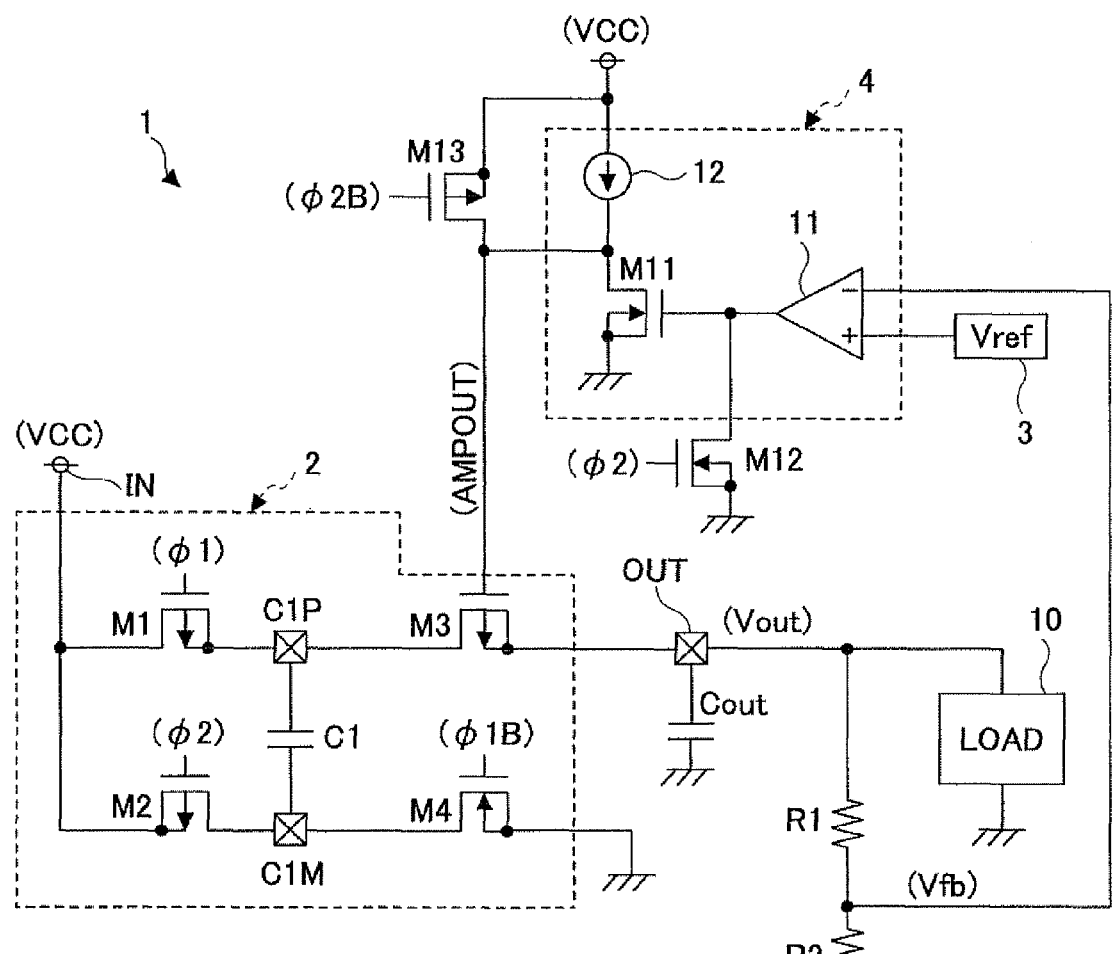
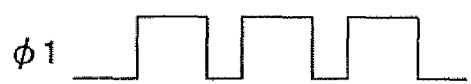
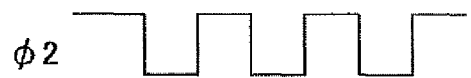

POWER SUPPLY CIRCUIT AND METHOD FOR CONTROLLING THE SAME

TECHNICAL FIELD

The present invention relates to a power supply circuit configured to supply power to a load for stably driving the load and to a method for controlling an operation of the power supply circuit.

BACKGROUND ART

When a voltage higher than a power source voltage is required, a DC-DC converter using an inductor has been conventionally used as a power supply circuit. DC-DC converters have been used for many applications since a voltage at a desired level can be generated and power can be efficiently supplied to a load which consumes a large amount of current. However, it is difficult to downsize the DC-DC converter since components such as a transformer and a coil are required. Therefore, it has been impossible to include all components of the DC-DC converter in a semiconductor integrated circuit.

In view of these problems, a charge pump circuit has been sometimes used as a power supply circuit since the charge pump circuit can be downsized and is capable of high efficiencies. However, since the charge pump circuit raises an output voltage by adding a voltage of a capacitor charged by a voltage of a DC power source, the output voltage of the charge pump circuit is largely dependent on the power source voltage. Further, when a battery is used as the DC power source, the output voltage of the charge pump circuit decreases in accordance with a drop of a battery voltage, by a voltage level obtained by multiplying the drop in the battery voltage with a raising ratio of the voltage. As a result, the output voltage of the charge pump circuit rapidly decreases.

In order to avoid such effects of a change of the power source voltage, the following three methods have been suggested. As a first method, as shown in FIG. 5, a power source voltage VCC is controlled to be a constant voltage by a voltage regulator 101 and inputted to a charge pump circuit 102 to be raised. The raised voltage is then supplied to a load 110 (for example, see Patent Document 1). As a second method, as shown in FIG. 6, an input power source voltage VCC is inputted to the charge pump circuit 102 to be raised. The raised voltage is then inputted to the voltage regulator 101 and controlled as a constant voltage, and supplied to the load 110. As a third method, as shown in FIG. 7, when an output voltage Vout of a charge pump circuit becomes at a predetermined detection voltage or higher, each on-period of a transistor M101, which connects a flyback capacitor C1 in the charge pump circuit and a catch-back capacitor Cout provided outside the charge pump circuit, is forcibly shortened to obtain a constant output voltage.

[Patent Document 1] Japanese Patent Application Publication No. 2006-320158

An output voltage can be stabilized with stable ripple amplitude by the first and second methods. In these cases, however, there is required a voltage regulator which has a large output driver through which a maximum output current of the charge pump circuit can flow. Therefore, there is a problem in that chip size is increased.

By the third method, a constant voltage can be stably outputted by only monitoring an output voltage of the charge pump circuit and when the output voltage of the charge pump circuit becomes a predetermined level or higher, feeding back a detected signal to a clock unit which controls ON/OFF of the charge pump circuit. However, since each on-period of the charge pump circuit is forcibly shortened, there is a problem in that a ripple amplitude of the output voltage becomes larger.

DISCLOSURE OF INVENTION

The present invention has been made in view of the above problems and it is an object of at least one embodiment of the present invention to provide a power supply circuit which can output a constant voltage required for stably driving a load regardless of a variation of a power source voltage, by optimally controlling a gate voltage of a transistor included in a charge pump circuit, and to provide a method for controlling an operation of the power supply circuit.

According to one aspect of the invention, a power supply circuit includes a charge pump circuit configured to raise a voltage inputted from an input terminal and supply the raised voltage from an output terminal to a given load and a control circuit unit. The charge pump circuit includes a fly-back capacitor configured to store a charge of the voltage inputted from the input terminal and an output transistor connected between one terminal of the fly-back capacitor and the output terminal of the charge pump circuit. The control circuit unit receives a reference voltage and the voltage outputted from the charge pump circuit and is configured to generate a proportional voltage proportional to the voltage outputted from the charge pump circuit and output a voltage to control the output transistor depending on a difference between the proportional voltage and the reference voltage so that the proportional voltage has the same voltage level as the reference voltage.

According to another aspect of the invention, there is provided a method for controlling an operation of a power supply circuit including a charge pump circuit configured to raise a voltage inputted from an input terminal and supply the raised voltage from an output terminal to a given load. The charge pump circuit includes a fly-back capacitor configured to store a charge of the voltage inputted from the input terminal and a transistor connected between one terminal of the fly-back capacitor and the output terminal of the charge pump circuit. The method includes steps of controlling the transistor so that a voltage proportional to the raised voltage becomes the same level as a reference voltage and keeping the raised voltage constant based on said controlling of the transistor for provision to the load.

BRIEF DESCRIPTION OF DRAWINGS

FIG. 3 is a diagram showing another example of a power supply circuit and an example of clock signals of the first embodiment of the present invention.

BEST MODE FOR CARRYING OUT THE INVENTION

Figure 1:
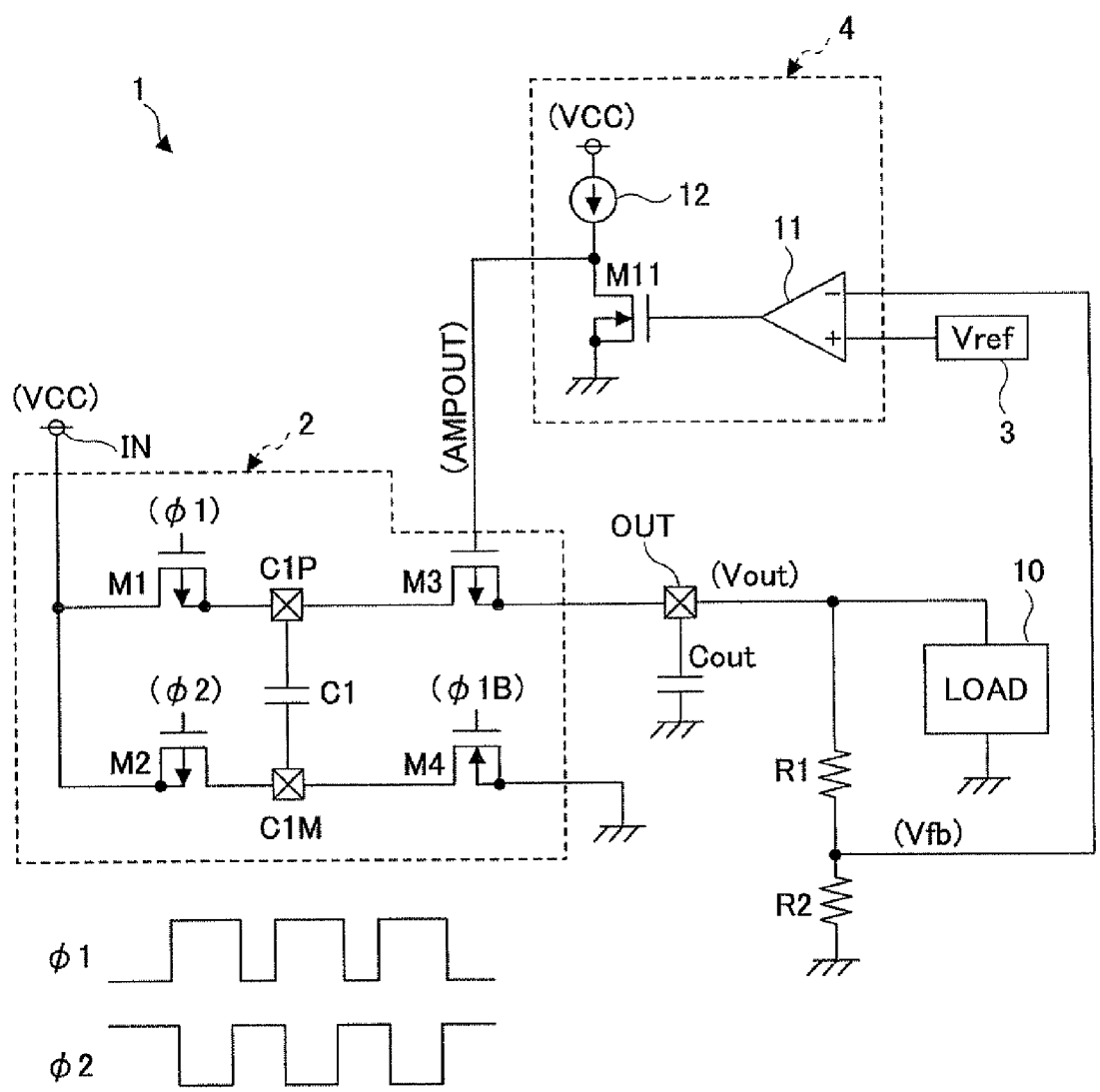
FIG. 1 is a diagram showing an example of a power supply circuit and an example of clock signals of a first embodiment of the present invention.

The present invention is described in detail based on the embodiment illustrated in the drawings.

(First Embodiment)

FIG. 1 is a diagram showing an example of a power supply circuit of a first embodiment of the present invention. In a power supply circuit 1 shown in FIG. 1, a power source voltage VCC inputted to an input terminal IN is raised and a predetermined constant voltage is generated. The generated constant voltage is outputted as an output voltage Vout from an output terminal OUT to a load 10. In this manner, power is supplied to the load 10.

The power supply circuit 1 includes a charge pump circuit 2; a reference voltage generating circuit 3 capable of generating and outputting a predetermined reference voltage Vref; resistors R1 and R2 for detecting an output voltage, which are capable of dividing the output voltage Vout and generating and outputting a divided voltage Vfb; an error amplifier circuit 4, and a catch-back capacitor Cout. The charge pump circuit 2 includes PMOS transistors M1 through M3, an NMOS transistor M4, and a flyback capacitor C1. The error amplifier circuit 4 includes an operational amplifier circuit 11, a constant current source 12, and an NMOS transistor M11.

The PMOS transistor M3 serves as an output transistor, the resistors R1 and R2 serve as a proportional voltage generating circuit unit, the error amplifier circuit 4 serves as an error amplifier circuit unit, the NMOS transistor M11 serves as a first transistor, and the constant current source 12 and the NMOS transistor M11 serve as an output circuit. Further, FIG. 1 shows an example in which the PMOS transistors M1 through M3, the NMOS transistor M4, the reference voltage generating circuit 3, the error amplifier circuit 4, and the resistors R1 and R2 are integrated in one IC. The IC includes the input terminal IN, an output terminal OUT, and connecting terminals C1P and C1M.

The PMOS transistor M1 is connected between the input terminal IN and the connecting terminal C1P. The PMOS transistor M2 is connected between the input terminal IN and the connecting terminal C1M. The flyback capacitor C1 is connected between the connecting terminals C1P and C1M. The PMOS transistor M3 is connected between the connecting terminal C1P and the output terminal OUT. The NMOS transistor M4 is connected between the connecting terminal C1M and ground potential. The catch-back capacitor Cout is connected between the output terminal OUT and ground potential. The resistors R1 and R2 are connected in series between the output terminal OUT and ground potential. The divided voltage Vfb is outputted from a connection between the resistors R1 and R2 and inputted to an inverting input terminal of the operational amplifier circuit 11.

The reference voltage Vref is inputted to a non-inverting input terminal of the operational amplifier circuit 11. An output terminal of the operational amplifier circuit 11 is connected to a gate of the NMOS transistor M11. The constant current source 12 and the NMOS transistor M11 are connected in series between the power source voltage VCC and ground potential. A connection between the constant current source 12 and the NMOS transistor M11, which serves as an output terminal of the error amplifier circuit 4, is connected to a gate of the PMOS transistor M3. A clock signal $\phi1$, a clock signal $\phi2$, and an inverted signal $\phi1B$ which is an inverted clock signal $\phi1$ are inputted to a gate of the PMOS transistor M1, a gate of the PMOS transistor M2, and a gate of the NMOS transistor M4, respectively. Note that the clock signals $\phi1$ and $\phi2$ are expressed by rectangular waveforms with timings as shown in a lower diagram of FIG. 1.

With such a configuration, the PMOS transistors M1, M2, and the NMOS transistor M4 are turned ON/OFF in accordance with the clock signals $\phi1$ and $\phi2$. The error amplifier circuit 4 controls an operation of the PMOS transistor M3 so that the divided voltage Vfb has the same level as the reference voltage Vref. In this manner, the error amplifier circuit 4 controls on-resistance of the PMOS transistor M3 so that the output voltage Vout becomes constant at a predetermined level.

Figure 2:
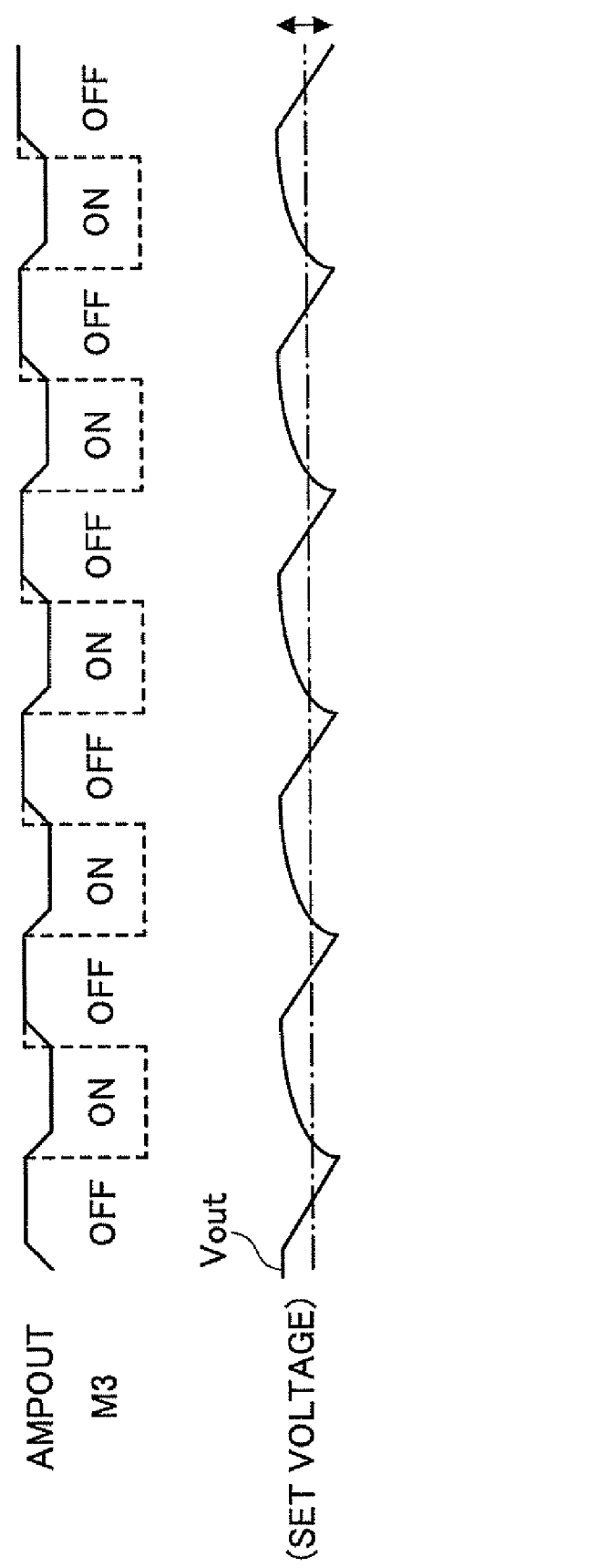
FIG. 2 is a timing chart showing an example of a relationship between an output signal AMPOUT and an output voltage Vout of the power supply circuit shown in FIG. 1.

FIG. 2 is a timing chart showing an example of a relationship between an output signal AMPOUT of the error amplifier circuit 4, which is inputted to the gate of the PMOS transistor M3, and the output voltage Vout. The operation of the power supply circuit 1 shown in FIG. 1 is described in more detail with reference to FIG. 2.

When the clock signal $\phi1$ is at a low level, the PMOS transistor M1 and the NMOS transistor M4 are turned on and become conductive. Since the clock signal $\phi2$ is at a high level at this time, the PMOS transistor M2 is turned off and becomes non-conductive. In this case, the output voltage Vout is higher than a set voltage as shown in FIG. 2. Therefore, the operational amplifier circuit 11 turns off the NMOS transistor M11 to be non-conductive in order to drop the output voltage Vout to the set voltage. Thus, the output signal AMPOUT of the error amplifier circuit 4 has a voltage capable of turning off the PMOS transistor M3 to be non-conductive. In view of these, the flyback capacitor C1 is charged by the power source voltage VCC.

Moreover, when the clock signal $\phi1$ is at a high level, the PMOS transistor M1 and the NMOS transistor M4 are turned off and become non-conductive. As the clock signal $\phi2$ is at a low level at this time, the PMOS transistor M2 is turned on and becomes conductive. As shown in FIG. 2, the output voltage Vout is lower than the set voltage. Therefore, the operational amplifier circuit 11 turns on the NMOS transistor M11 and controls on-resistance of the NMOS transistor M11 in order to raise the output voltage Vout to the set voltage. As a result, the output signal AMPOUT of the error amplifier circuit 4 has a voltage capable of turning on the PMOS transistor M3. The error amplifier circuit 4 controls a gate voltage of the PMOS transistor M3 and controls on-resistance of the PMOS transistor M3 so that the output voltage Vout becomes a predetermined voltage.

By repeating these operations in synchronization with a frequency of a clock signal for driving the charge pump circuit 2, the gate voltage of the PMOS transistor M3 is controlled and the on-resistance of the PMOS transistor M3 is optimized. In this manner, the output voltage Vout can be stabilized without making a ripple amplitude of the output voltage Vout larger.

FIG. 3 is a diagram showing another example of a power supply circuit of the first embodiment of the invention. In FIG. 3, components that are the same or similar to those in FIG. 1 are denoted by the same reference numerals and their descriptions are omitted here. Only the differences between FIGS. 1 and 3 are described below.

FIG. 3 is different from FIG. 1 in that an NMOS transistor M12 and a PMOS transistor M13 are additionally provided. The NMOS transistor M12 serves as a second transistor and the PMOS transistor M13 serves as a third transistor. Further, the PMOS transistors M1 through M3 and M13, the NMOS transistors M4 and M12, the reference voltage generating circuit 3, the error amplifier circuit 4, and the resistors R1 and R2 are integrated in one IC in this example.

The NMOS transistor M12 is connected between the output terminal of the operational amplifier circuit 11 and ground potential. The clock signal φ2 is inputted to a gate of the NMOS transistor M12. Further, the PMOS transistor M13 is connected in parallel to the constant current source 12. An inversion signal φ2B which is an inverted clock signal φ2 is inputted to a gate of the PMOS transistor M13.

Figure 4:
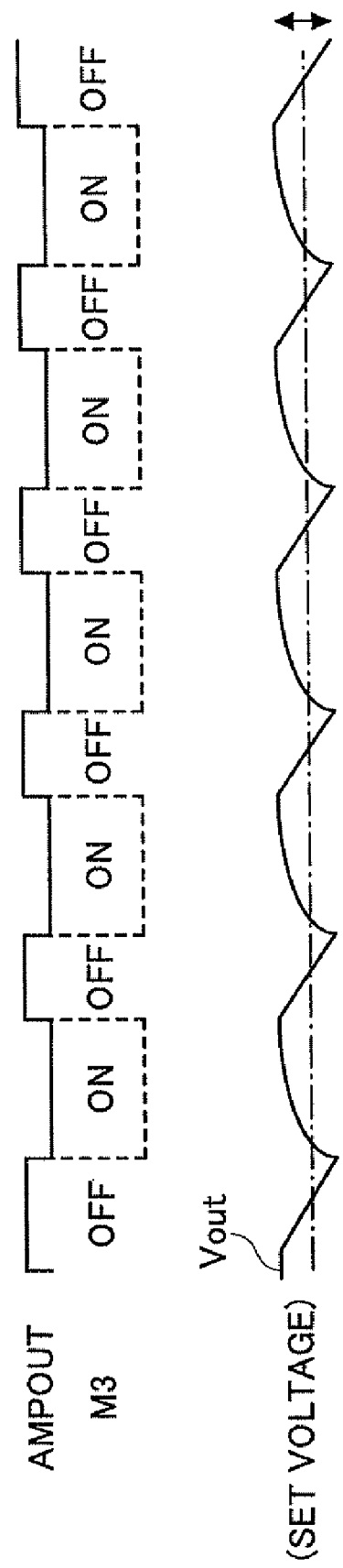
FIG. 4 is a timing chart showing an example of a relationship between an output signal AMPOUT and an output voltage Vout of the power supply circuit shown in FIG. 3.
Figure 5:
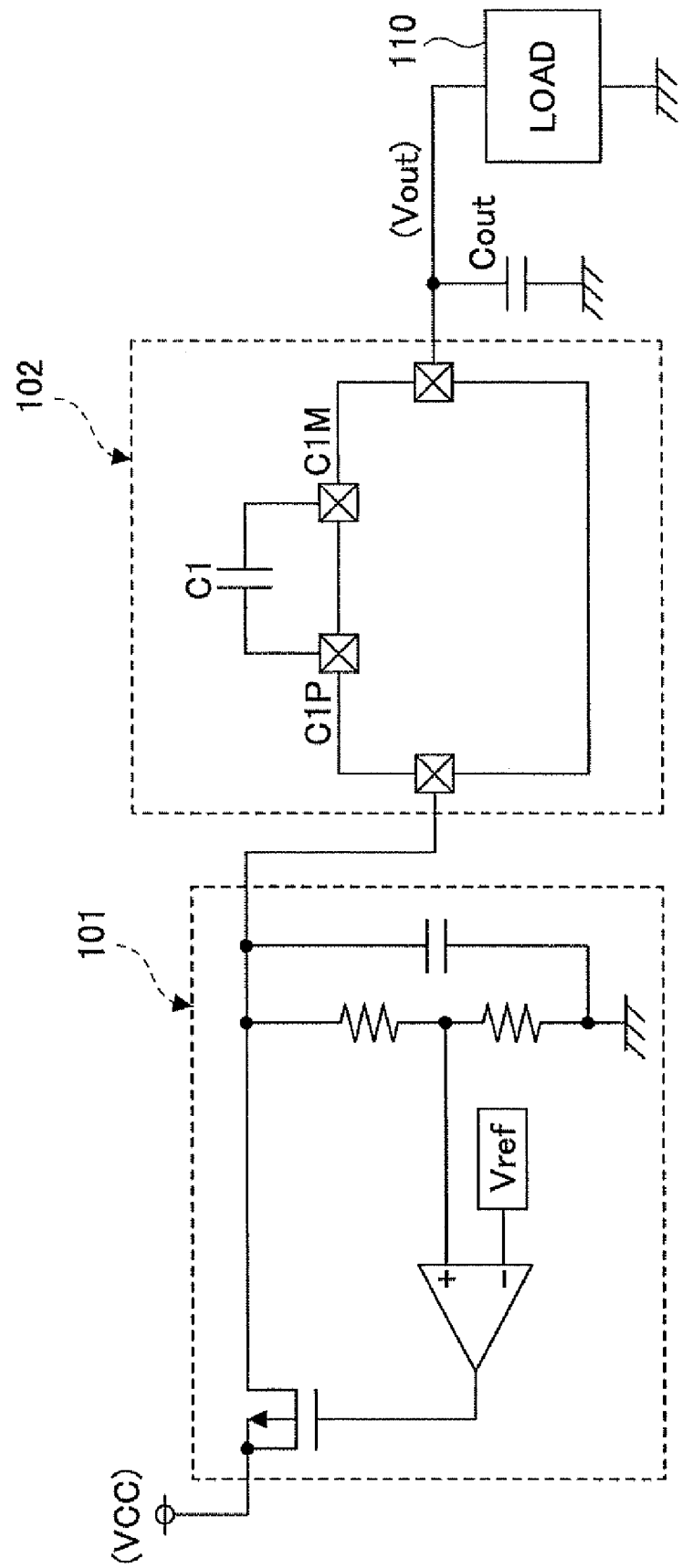
FIG. 5 is a diagram showing an example of a conventional power supply circuit.
Figure 6:
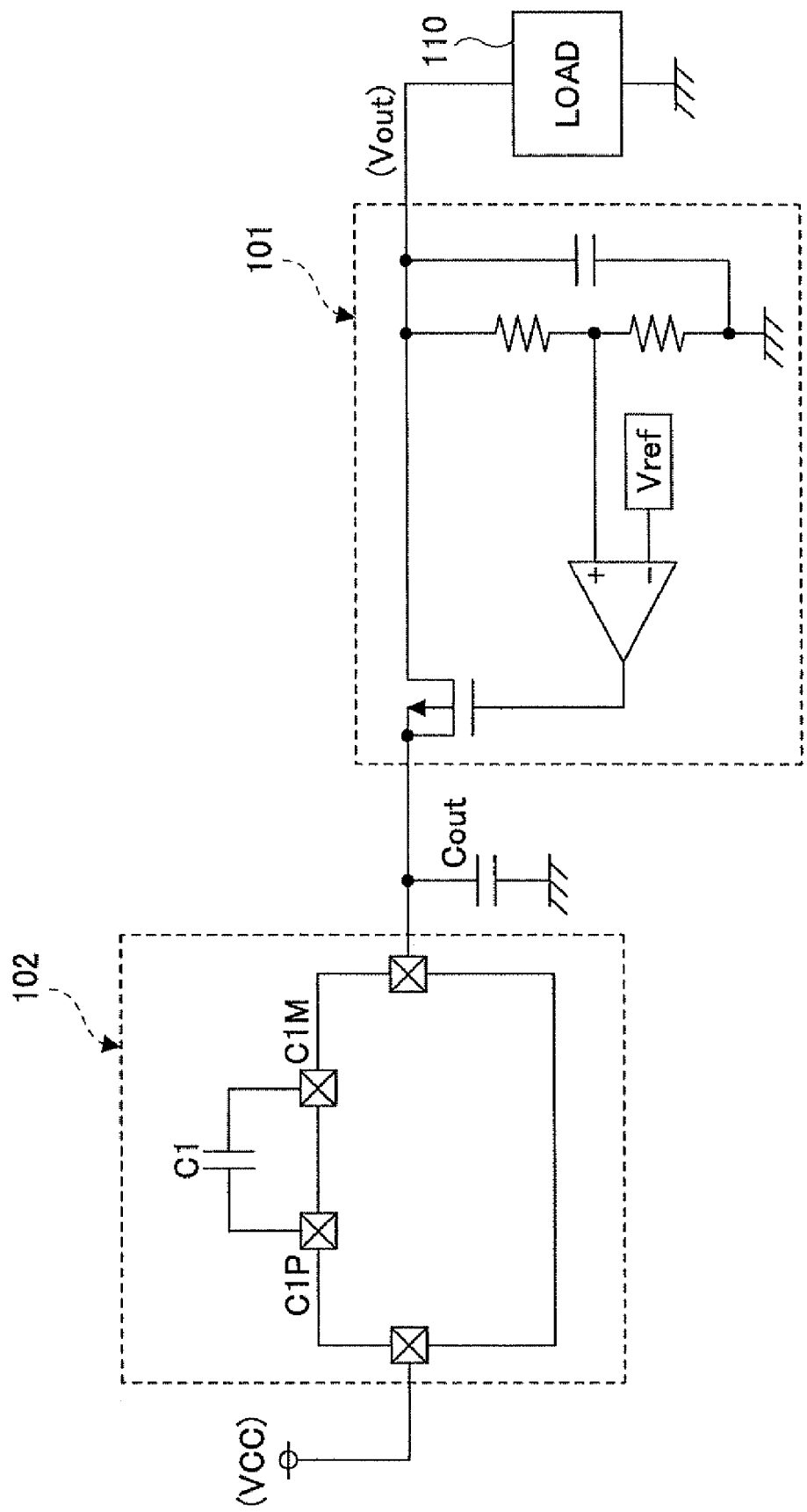
FIG. 6 is a diagram showing another example of a conventional power supply circuit.
Figure 7:
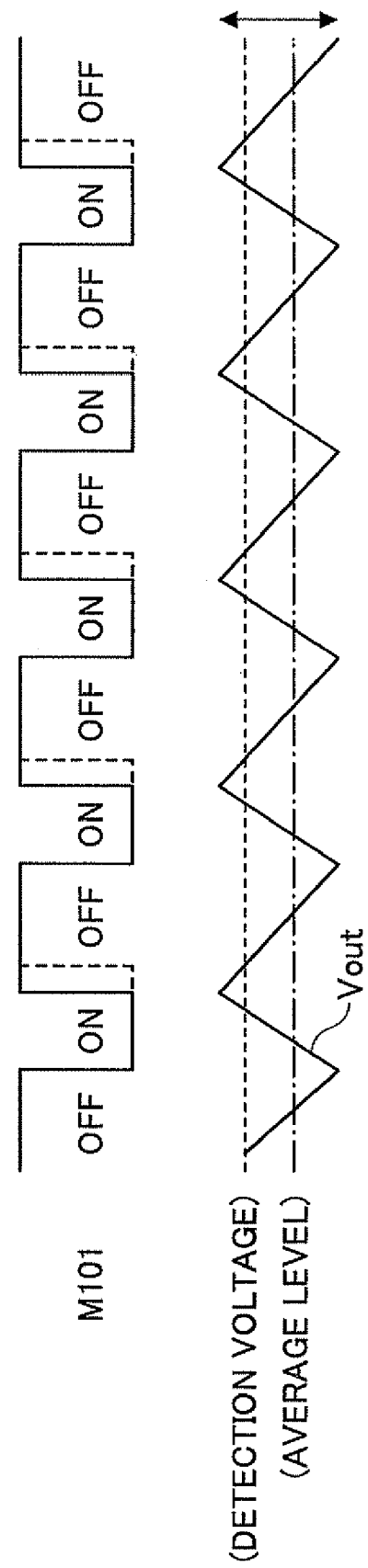
FIG. 7 is a timing chart showing an example of a relationship between an operation of a transistor M101 and an output voltage Vout in a conventional power supply circuit.

In this manner, the output signal AMPOUT of the error amplifier circuit 4 can be rapidly raised or dropped and the output signal AMPOUT in FIG. 2 can have a waveform as shown in FIG. 4. In FIG. 3, only one of the NMOS transistor M12 and the PMOS transistor M13 may be provided.

In the power supply circuit of the first embodiment of the present invention, a charge stored in the flyback capacitor C1 is pumped into the catch-back capacitor Cout by the PMOS transistor M3 which connects the connecting terminal C1P connected to one terminal of the flyback capacitor C1 and the output terminal OUT connected to one terminal of the catch-back capacitor Cout, thereby the power source voltage VCC is raised. To control the output voltage Vout to be constant, the raised output voltage Vout is fed back through a feed-back circuit, which is formed of the resistors R1 and R2 and connected to the output terminal OUT, to the error amplifier circuit 4 which controls the gate voltage of the PMOS transistor M3, thereby the on-resistance of the PMOS transistor M3 is controlled. As a result, a constant voltage required for stably driving a load can be outputted regardless of a change of the power source voltage.

According to the power supply circuit of the present invention and the method for controlling the operation of the power supply circuit of the present invention, the operation of the output transistor which is included in the charge pump circuit and connected between one terminal of the flyback capacitor included in the charge pump circuit and the output terminal of the charge pump circuit, is controlled so that the proportional voltage which is in proportion to the output voltage outputted from the output terminal becomes the same level as a predetermined reference voltage. As a result, the output voltage of the charge pump circuit is controlled to be a constant voltage and supplied to the load. In this manner, a constant voltage required for stably driving the load can be outputted regardless of the change of the power source voltage.

Further, instead of using a regulator having a large output driver to stably output the voltage, which increases the chip size, a regulator circuit having an output driver served by a transistor which connects one terminal of the flyback capacitor and the output terminal of the charge pump circuit is used among transistors included in the charge pump circuit. As a result, the increase of the chip size can be prevented.

Further, instead of employing the conventional method to shorten each on-period of the charge pump circuit to stabilize the output voltage, which increases a ripple amplitude, a gate voltage of a transistor which transmits a charge stored in the flyback capacitor to the catch-back capacitor is controlled in accordance with the level of the output voltage. As a result, the on-resistance of the transistor is controlled. In this manner, a stable output voltage can be obtained without increasing the ripple amplitude.

The present application is based on Japanese Priority Application No. 2008-005844 filed on Jan. 15, 2008, with the Japanese Patent Office, the entire contents of which are hereby incorporated by reference.

The invention claimed is:
1. A power supply circuit comprising:
a charge pump circuit configured to raise a voltage inputted from an input terminal and supply the raised voltage from an output terminal to a given load; and
a control circuit unit,
wherein the charge pump circuit includes:
a fly-back capacitor configured to store a charge he voltage inputted from the input terminal; and
an output transistor connected between one terminal of the fly-back capacitor and the output terminal of the charge pump circuit,
wherein the control circuit unit receives a reference voltage and the voltage outputted from the charge pump circuit and is configured to generate a proportional voltage proportional to the voltage outputted from the charge pump circuit and output a voltage to control the output transistor depending on a difference between the proportional voltage and the reference voltage so that the proportional voltage has the same voltage level as the reference voltage,
wherein the control circuit unit includes
a proportional voltage generating circuit unit configured to divide the voltage outputted from the output terminal of the charge pump circuit at a predetermined dividing ratio to generate the proportional voltage, and
an error amplifier circuit configured to amplify a voltage corresponding to a difference between the proportional voltage and the reference voltage to output the amplified voltage to a control electrode of the output transistor,
wherein the error amplifier circuit further comprises:
an operational amplifier circuit which includes an input terminal to receive the proportional voltage, another input terminal to receive the reference voltage, and an output terminal configured to output an output signal; and
an output circuit including a constant current source capable of generating and outputting a predetermined constant current and a first transistor having a control electrode to which the output signal outputted by the operational amplifier circuit is inputted, the constant current source and the first transistor being connected in series between the input voltage and a ground potential,
wherein a connection between the constant current source and the first transistor serves as an output terminal which is connected to the control electrode of the output transistor, and
wherein the power supply circuit further comprises a second transistor connected between the output terminal of the operational amplifier circuit and the ground potential, wherein the second transistor is controlled to be turned on only during a cycle in which the fly-back capacitor is discharged.
2. A power supply circuit comprising:
a charge pump circuit configured to raise a voltage inputted from an input terminal and Supply the raised voltage an output terminal to a given load; and
a control circuit unit,
wherein the charge circuit includes:
fly-back capacitor configured to store a charge of the voltage inputted from the input terminal; and
an output transistor connected between one terminal of the fly-back capacitor and the output terminal of the charge pump circuit,
wherein the control circuit unit receives a reference voltage and the voltage outputted from the charge pump circuit and is configured to generate a proportional voltage proportional to the voltage outputted from the charge pump circuit and output a voltage to control the output transistor depending on a difference between the proportional voltage and the reference voltage so that the proportional voltage has the same voltage level as the reference voltage, wherein the control circuit unit includes a proportional voltage generating circuit unit configured to divide the voltage outputted from the output terminal of the charge pump circuit at a predetermined dividing ratio to generate the proportional voltage, and an error amplifier circuit configured to amplify a voltage corresponding to a difference between the proportional voltage and the reference voltage to output the amplified voltage to a control electrode of the output transistor, wherein the error amplifier circuit further comprises:
an operational amplifier circuit which includes an input terminal to receive he proportional voltage, another input terminal to receive the reference voltage, and an output terminal configured to output an out output signal; and
an output circuit including a constant current source capable of generating and outputting a predetermined constant current and a first transistor having a control electrode to which the output signal outputted by the operational amplifier circuit is inputted, the constant current source and the first transistor being connected in series between the input voltage and a ground potential, wherein a connection between the constant current source and the first transistor serves as an output terminal which is connected to the control electrode of the output transistor, and wherein the power supply Circuit further comprises a third transistor connected parallel to the constant current source, wherein the third transistor is controlled to he turned on only during a cycle in which the fly-back capacitor is charged.

3. A method for controlling an operation of a power supply circuit including a control circuit unit and a charge pump circuit configured to raise a voltage inputted from an input terminal and supply the raised voltage from an output terminal to a given load, wherein the charge pump circuit includes:
a fly-back capacitor configured to store a charge of the voltage inputted from the input terminal; and
an output transistor connected between one terminal of the fly-back capacitor and the output terminal of the charge pump circuit, wherein the control circuit unit includes
a proportional voltage generating circuit unit configured to divide the voltage outputted from the output terminal of the charge pump circuit at a predetermined dividing ratio to a ratio generate proportional voltage, and
an error amplifier circuit configured to amplify a voltage corresponding to a difference between the proportional voltage and a reference voltage to output the amplified voltage to a control electrode of the output transistor, wherein the error amplifier circuit further comprises:
an operational amplifier circuit which includes an input terminal to receive he proportional voltage, another input terminal to receive the reference voltage, and an output terminal configured to output an output signal; and
an output circuit including a constant current source capable of generating and outputting a predetermined constant current and a first transistor having a control electrode to which the output signal outputted by the operational amplifier circuit is inputted the constant current source and the first transistor being connected in series between the input voltage and a ground potential, wherein a connection between the constant current source and the first transistor serves as an output terminal which is connected to the control electrode of the output transistor, and wherein the power supply circuit further comprises a second transistor connected between the output terminal of the operational amplifier circuit and the ground potential, the method comprising:
controlling the output transistor so that a voltage proportional to the raised voltage becomes the same level as the reference voltage;
keeping the raised voltage constant based on said controlling of the output transistor for provision to the load; and
controlling the second transistor to be turned on only during a cycle in which the fly-back capacitor is discharged.

4. The method of claim 3, wherein the power supply circuit further comprises a third transistor connected parallel to the constant current source, and the method further comprises controlling the third transistor to be turned on only during a cycle in which the fly- back capacitor is charged.

5. The power supply circuit of claim 1 further comprising a third transistor connected parallel to the constant current source, wherein the third transistor is controlled to be turned on only during a cycle in which the fly-back capacitor is charged.

* * * * *